Figure 1:
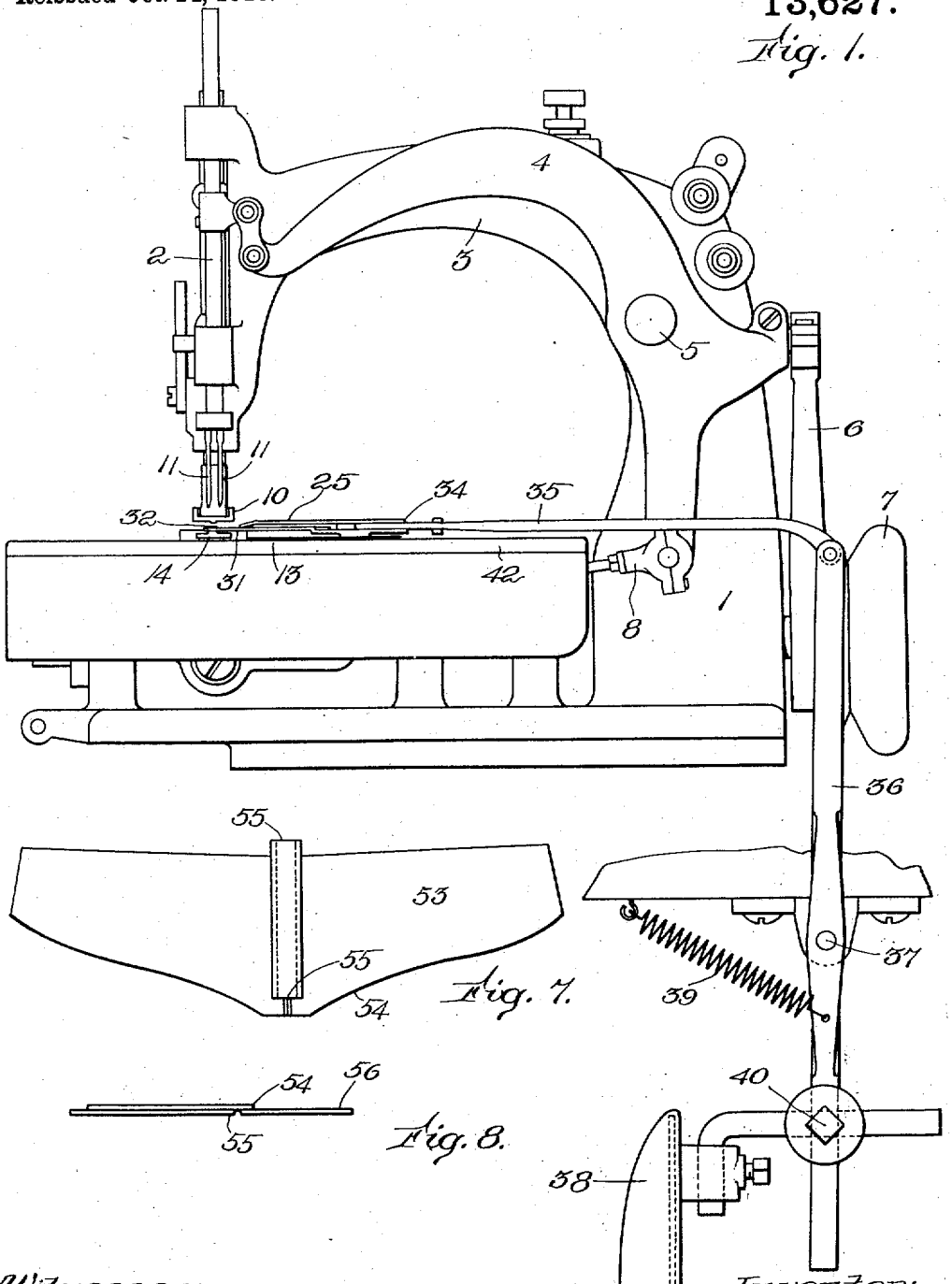

F. S. JENNINGS.

SEWING MACHINE CUT-OFF ATTACHMENT FOR TAPES.

APPLICATION FILED SEPT. 2, 1913.

2 SHEETS—SHEET 1.

Reissued Oct. 14, 1913.

13,627.

Witnesses:
William J. Pike.
Edward Maxwell

Inventor:
Frank S. Jennings,
by Geo. S. Maxwell,
Attorney.

F. S. JENNINGS.
SEWING MACHINE CUT-OFF ATTACHMENT FOR TAPES.
APPLICATION FILED SEPT. 2, 1913.
2 SHEETS—SHEET 2.
Reissued Oct. 14, 1913.
Fig. 2. 13,627.
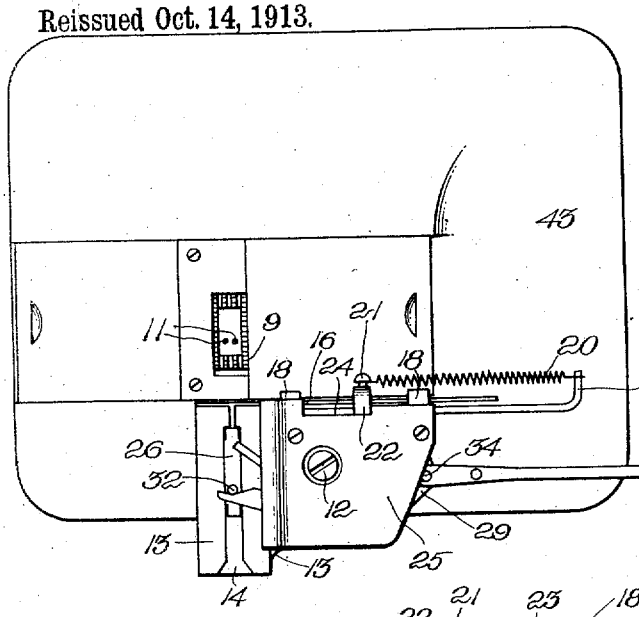
Fig. 6.
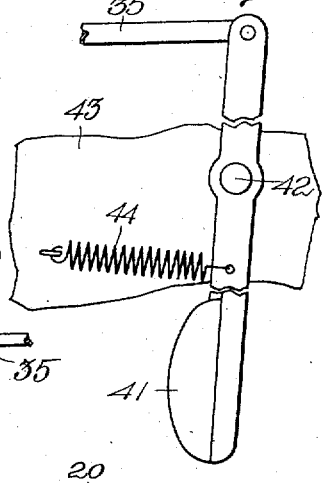
Fig. 3.
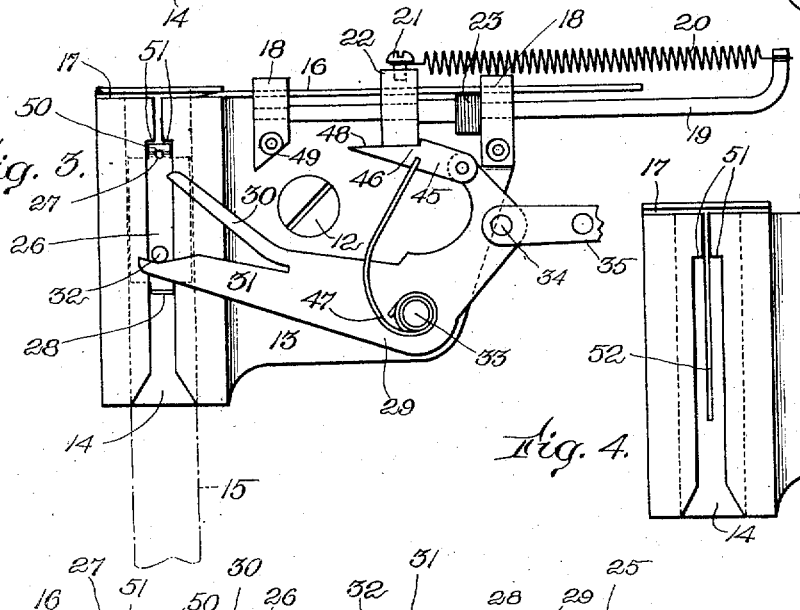
Fig. 4.
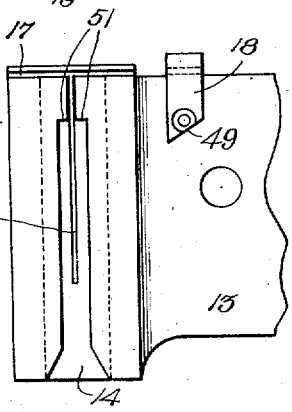
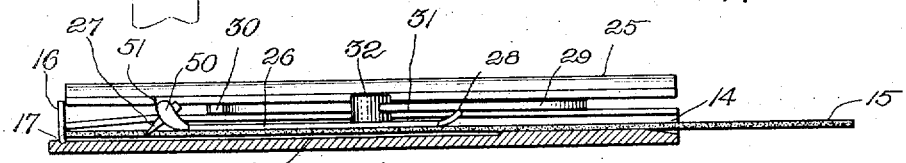
Fig. 5.
Witnesses:
William J. Pike.
Edward Maxwell.
Inventor:
Frank S. Jennings.
by Geo. H. Maxwell,
Attorney.

UNITED STATES PATENT OFFICE.

FRANK S. JENNINGS, OF CINCINNATI, OHIO, ASSIGNOR TO BOSTON MACHINE WORKS COMPANY, OF BOSTON, MASSACHUSETTS, A CORPORATION OF MASSACHUSETTS.

SEWING-MACHINE CUT-OFF ATTACHMENT FOR TAPES.

13,627. Specification of Reissued Letters Patent. Reissued Oct. 14, 1913.

Original No. 1,070,137, dated August 12, 1913, Serial No. 504,965. Application for reissue filed September 2, 1913. Serial No. 787,680½.

*To all whom it may concern:*

Be it known that I, FRANK S. JENNINGS, a citizen of the United States, residing at Cincinnati, in the county of Hamilton and State of Ohio, have invented an Improvement in Sewing-Machine Cut-Off Attachments for Tapes, of which the following description, in connection with the accompanying drawings, is a specification, like letters on the drawings representing like parts.

The present invention is particularly intended for shoe factory use, in connection with sewing machines for sewing on the tapes onto the backstays of uppers and foxings and elsewhere, wherever stay tapes are required, whereby this work is greatly facilitated, and it is made possible to sew piece after piece without stopping the machine.

As at present ordinarily accomplished, the operator is obliged to stop the machine before the end of the work is reached, turn up the projecting end of the work and cut off the tape with the scissors at the right distance from said end, and then sew the remaining end of the tape to the work, this tedious operation being repeated in connection with each piece of work. By the present invention the skilled operator stitches straight ahead, and when the end of a piece of work is about reached, simply deflects her elbow, knee, or foot, as the case may be, thereby instantly operating the cut off device, which severs the tape at the right point for finishing said piece of work, and then instantly and automatically moves out of the way of the feeding forward of the tape. Then as the operator is placing the next piece in position to follow continuously the first piece, the feeding mechanism automatically moves or shoots forward the tape again in correct position to begin with said second piece of work. The same operation is repeated with the third piece, which is fed in while the second piece is being finished, the tape having meanwhile been again severed at the critical moment and exact place necessary for completing said second piece, the cut-off device having moved back independently of the operator and of the feeding mechanism, and the following portion of the tape having been shot or fed forward by said feeding mechanism for the third piece as before. If desired, the operator slows down the machine slightly at the moment of severing, this depending upon the degree of skill which the operator attains. Thus, not only is the work enabled to progress much more rapidly than before, thereby saving a great deal of time and getting more work from a given machine, but there is no loss of tape, no waste of thread, no irregularity of stitching, and the work is much less fatiguing to the eyes and hands. Both the cutting action and the feeding action are under the definite control of the operator but as soon as the cut off device has accomplished its work the operator loses control of it but not of the feeding device, and the cut off device instantly darts back out of the way of the feeding forward of the work whenever the operator desires so to feed forward said work. By an outward movement of the elbow or knee the cut off device is caused to dart forward and back again and the feeding mechanism is retracted ready for a feeding movement whenever the operator moves her elbow or knee back inward. A shearing cut is preferred, but the invention, broadly considered, is not limited to such details, but resides in providing means for cutting off the tape simultaneously with its feeding forward and the stitching thereof as a continuous operation.

In the accompanying drawings, in which is illustrated a preferred embodiment of the invention, Figure 1 is a view in front elevation of a sewing machine embodying the improvements, parts being broken away for convenience; Fig. 2 is a plan view thereof, the upper portion of the machine being omitted; Fig. 3 is an enlarged plan view of the cut off mechanism, the top plate being removed; Fig. 4 is a plan view of the bottom plate of the cut off mechanism; Fig. 5 is a considerably enlarged sectional view taken longitudinally through the center of the tape path, showing the tape in position; Fig. 6 is a fragmentary detail in plan, showing an arm operating lever; and Figs. 7 and 8 show respectively in bottom plan and side elevation the work done by the machine.

As this invention is applicable to any of the usual sewing machines employed in shoe factories, it is not herein undertaken to show all the details of the sewing machine proper, a usual "Union Special" sewing machine head 1 being shown, containing a needle bar 2 guided in a stationary arm 3 and operated by a movable arm 4, pivoted at 5, and actuated by a rod 6 and belt wheel 7, said arm 4 reciprocating the rod 8 and the work being fed by a feed 9 beneath the usual presser foot 10. A two needle machine is herein shown, the needles being indicated at 11, but it will be understood that the invention is not limited in this respect, two needle machines being such as are more frequently employed in shoe factories for stitching on backstay reinforcing tapes and the like.

Immediately in front of the feed plate 9 and needles 11 located in the necessary path of the work and tape, is secured by any suitable means, as by a screw 12, a plate 13 having a guide way 14 for directing the tape 15 to be stitched by the needles 11, and across the front end of said guide way, next to the feeding and stitching mechanism of the machine, is mounted suitable cutting means, herein shown as a knife 16 sliding in a groove 17 at the end of the tape guide 14 and in grooved holders 18 projecting from the bottom plate 13, said holders also holding an arm 19, to the outer end of which is fast a retracting spring 20 secured by a set screw 21 to a block 22, which is held fast by said set screw on the knife 16. A ferrule 23 limits the backward movement of the block 22 and its knife, which are also limited by a cut out portion 24 in a top plate 25 of the mechanism. Sliding in the ways 14 is a push plate 26, provided with a sharp pointed feed pin 27 at its front end, slanted forward at its lower end as shown in Fig. 5, so as to feed positively forward the tape 15 upon moving forward, and not to move the tape upon moving backward, being upturned at 28 for further preventing the backward movement of the tape when said plate moves backward. This plate is moved at the proper times by a bell crank lever 29, whose forward end has two extending parts in the form of fingers 30 and 31, which alternately engage a stud 32 on said plate, the former finger 30 moving the plate backward, and the finger 31 moving it quickly forward. The bell crank or elbow lever 29 is pivoted at 33 and operated by any suitable means which leaves the operator's hands free to manipulate the work, as by the knee, foot, elbow, or arm, being preferably connected, as by a pivot at 34 to a link 35 operated, for example by the knee, by a lever 36 pivoted at 37 to the frame of the machine and adapted to be operated by a knee pad 38, against a spring 39, said pad being shown as adjustably secured at 40 so as to vary the height thereof to suit different operators.

In Fig. 6 is shown a pad 41 pivoted at 42 to the table 43 of the machine, in position to be operated by the elbow or arm in opposition to a spring 44.

The bell crank 29 carries an actuating dog 45, notched at 46 to push against the block 22, being maintained in its engagement by a spring 47, this arrangement being a convenient means for the quick operation of the knife 16. As said knife completes its cutting movement the forward end 48 of the dog 45 rides up on the inclined surface 49 of the adjacent block 18 and thereby disengages or trips the knife, permitting the spring 20 instantly to retract the knife. This movement is independent of the control of the operator and takes place while the feeding plate 26 is being retracted. The fingers 30 and 31 of the feeding mechanism are separated as a convenient means for providing lost motion to permit a large swing of the bell crank 29 for giving proper cutting movement to the knife, and a short feeding movement to the work. The upturned forward end of the feed plate 26 is sufficiently broad, as indicated at 50, to strike the shoulders 51 at the throated end of the feed way, for limiting the forward movement of the feed plate 26, and the bottom of the feed way is provided with a groove 52 in which the point of the pin 27 may travel forward, as clearly shown in Figs. 4 and 5.

In use, the operator starts the end of the tape 15 and the seam portion of the upper or other leather piece 53, Fig. 7, to be stayed, beneath the needles, and the work proceeds forward to the point where the tape should be severed, the rear end 54 of the work then overlying to a short extent the cut off mechanism, whereupon the operator instantly moves her knee laterally (or it may be elbow or so forth as before explained), thereby instantly shooting forward the cutting knife 16, shearing off the tape at the point 55 Fig. 7. The spring 20 immediately draws back the knife automatically, as soon as it reaches the limit of its cutting movement. This moves the knife back out of the way of the oncoming tape but leaves the feeding mechanism still under the control of the operator. Ordinarily the operator immediately moves her elbow or knee inward, and, if desired, out of engagement with the elbow lever or knee lever, whereupon the finger 31 of the crank or lever 29 suddenly strikes the stud 32 of the feed plate, thereby shooting forward the tape in position to be caught by the needles 11, it being understood that the operator has meanwhile fed along a second piece 53 ready to coöperate with the fresh tape-end thus fed forward. In this manner the work proceeds right along continuously. The operator is not obliged to stop the machine and turn up the rear end 54 of the work being stitched in order to cut off the tape at the right point with her scissors, but, as soon as she is skilled in the work, she simply actuates the bar 35 at the critical instant while she is placing the next piece of work in position to follow along without substantial break in the continuity of the stitching. Usually the operator finds it convenient to place the work as shown in Fig. 8, where the rear end 54 of the preceding piece 53 overlaps the front end of the following piece 56 just above the forward end of the feed way of the cut off mechanism, so that the tape and succeeding piece of work are brought together against each other as the work is pushed forward, the rapidity of the stitching serving to pull forward the front piece of work 53 and its tape away from the following work and tape during the moment which intervenes between the severing of the tape and the beginning of the stitching of the second piece. As is well known, the sewing machines in shoe factories are run at a high speed, and the purpose of this invention is to enable the operator, if sufficiently skilled, to cut off and feed the tape at as nearly a corresponding speed as possible, although it will be understood that the operator, unless exceptionally skilled, may, and usually does, find it preferable to slow down the stitching, although not so as to stop the machine, at the moment of feeding a fresh piece of work. The cut off and tape feeding mechanism and its operating parts are so constructed that the operator, by a quick motion of her knee to the right, can sever the tape by a sharp blow of the knife or other cutting means, without interfering with the forward feeding movement of the tape by the mechanism 9 of the sewing machine. The knife then escapes from her control and goes back to inoperative position and she can then, at will, control the forward feeding of the tape so that it will not be shot ahead of its proper position with relation to the preceding piece, whose stitching is just being finished, this control being either with the knee, or, preferably, being accomplished by the fingers which are holding down the new piece of work above the feed way and feed plate, as a slight downward pressure on the stud 32 will serve to restrain the feed plate momentarily, and, when the pressure is relieved, the spring 39 or 44 operates instantly to move rapidly forward the feed plate 26 and tape as the operator similarly moves forward the fresh piece of work to follow close to the rear end 54 of the preceding piece. The plane of the plate 25 is purposely raised, as shown clearly in Figs. 1, 2, and 5, above the projecting portions of the fingers 30, 31 and the stud 32, so as to hold the work normally away from the latter and prevent any tendency to stop or hold back the tape feeding mechanism unintentionally by the pressure of the hand and fingers.

It will be understood that, except as otherwise stated in the claims the invention is not limited to any particular constructional details, as it is believed to be broadly new in several respects, as hereinafter pointed out.

Having described my invention, what I claim as new and desire to secure by Letters Patent is:

1. In a machine for applying reinforcing tape to shoe uppers and the like, a tape cut-off device, a tape feeding device, and operating mechanism for said two devices, a device for controlling the forward movement of the cut-off device, means for automatically disengaging said controlling device from controlling relation to the cut-off device when the latter has reached the limit of its cutting movement, and means independent of the feeding device for instantly retracting the cut-off device when the latter is thus released.

2. In a machine for applying reinforcing tape to shoe uppers and the like, a tape cut-off device, a manually controlled tape feeding device, operating means to move the cut-off device in its cutting movement, tripping means to disengage said cut-off device from the control of said operating means at a predetermined point in the forward movement of the cut-off device, and automatic means beyond the control of the operator for then instantly retracting the cut-off device.

3. In a machine for applying reinforcing tape to shoe uppers and the like, a tape feeding device, a tape cut-off device, automatic means for moving the tape feeding device in a direction to feed, automatic means for returning the cut-off device, and manually operable means for simultaneously retracting the tape feeding device and moving forward the tape cut-off device, said means having a tripping connection with the tape cut-off device arranged to be operated at the end of the forward movement thereof.

4. In a machine for applying reinforcing tape to shoe uppers and the like, a tape feeding device, a tape cut-off device, and a common actuator for said two devices, including means for automatically disengaging said actuator from the cut-off device at a predetermined point in the forward movement of the latter, and thereafter leaving said actuator in control of the tape feeding device.

5. In a machine for applying reinforcing tape to shoe uppers and the like, a tape feeding device, a tape cut-off device, and a common actuator for said two devices, including an actuating dog for normally engaging and moving forward said cut-off device, tripping means for disengaging said dog from said cut-off device when the latter has performed its cutting operation, and a spring for then instantly retracting the cut-off device.

6. In a machine for applying reinforcing tape to shoe uppers and the like, a tape feeding device, a tape cut-off device, and a common actuator for said two devices, including an elbow lever provided on one arm, with an actuating dog for actuating the cut-off device to cut the tape and provided on the other arm with separate fingers for alternately engaging the feeding device for moving the latter in opposite directions, tripping means for disengaging said dog from the cut-off device prior to the feeding movement of the feeding device, and automatic means for restoring the cut-off device to inoperative position.

7. In a machine for applying reinforcing tape to shoe uppers and the like, tape feeding mechanism, manual operating means positively actuating said mechanism in all the latter's movements, a tape cut-off device, connections from said cut-off device to said operating means, and means for disconnecting said connections from the cut-off device when the latter has reached the forward limit of its cutting movement.

8. In a machine for applying reinforcing tape to shoe uppers and the like, tape feeding mechanism, a tape cut-off device, and operating mechanism for, and movable with relation to, each of said two devices, having a common actuator separate from said two devices, a portion of said actuator constituting means for moving into positive engagement with the feeding device and adapted to move the feeding device when so engaged with a sudden rapid forward movement, and connections between said parts providing a time interval between the retraction of said cut-off and the beginning of the feeding movement of said feeding device.

9. In a machine for applying reinforcing tape to shoe uppers and the like, a tape cut-off device, a tape feeding device, an operating mechanism for, and movable with relation to each of said devices including a common member for directly engaging both of said devices to operate the same through parts of their respective paths of movement, said member carrying means for positively moving the cut-off device in a direction to cut, means to disconnect the cut-off device from control by the operating mechanism at the completion of the operative movement of said cut-off device, and means arranged to become active after further movement of the operating mechanism for pressing forward the feeding device in a direction to feed.

10. In a machine for applying reinforcing tape to shoe uppers and the like, a guideway for the tape, a tape cut-off device movable relatively thereto, means to feed the tape, and means for moving said cut-off device having also an extending part to cooperate with said feeding means in feeding the work, at least one of said two means having a portion extending in position to be engaged by the operator, and a top plate raised above said extending portion sufficiently to maintain the work which rests over said guideway normally out of retarding engagement with said extending portion, but permitting the operator to control the feed by manually pressing the work upon said portion at will.

In testimony whereof, I have signed my name to this specification, in the presence of two subscribing witnesses.

FRANK S. JENNINGS.

Witnesses:

HENRY AUFDEM BRINKE,

I. FLEISCHER.

Copies of this patent may be obtained for five cents each, by addressing the "Commissioner of Patents, Washington, D. C."